Feb. 25, 1969   H. EBERHARD   3,429,048
GAUGING PRESS
Filed July 26, 1966   Sheet 3 of 5

INVENTOR
EBERHARD HAAS

BY Bailey, Stephens & Huettig
ATTORNEY

United States Patent Office 3,429,048
Patented Feb. 25, 1969

3,429,048
GAUGING PRESS
Haas Eberhard, Heilbron (Neckar), Germany, assignor to August Lapple G.m.b.H., & Co., Heilbronn (Neckar), Germany, a company
Filed July 26, 1966, Ser. No. 568,005
Claims priority, application Germany, July 28, 1965, L 40,128
U.S. Cl. 33—174
Int. Cl. G01b 3/34
4 Claims

ABSTRACT OF THE DISCLOSURE

A device for bringing gauging pattern elements into engagement with parts to be tested comprises a frame formed of four vertical columns, a work table at the bottom of said columns, a stationary threaded spindle in each of the columns, a slide mounted for vertical movement with respect to the columns, nuts rotatably carried by the slide engaging each of the spindles and driving means for the nuts also carried by the slide. The work table is mounted for horizontal movement on rollers which can be lifted off of their guides to fix the table in position.

---

The invention is concerned with a device constructed in the manner of a press and more especially with a gauging or testing device of the aforesaid kind for fitting gauging models or patterns upon or into work pieces to determine whether they are true to size. Such devices can be used, for example, for fitting models and patterns upon or into work pieces which must be finished and controlled as regards their dimensional accuracy, further they may be used for measuring and controlling control gauges, especially gauges which are used for the construction of voluminous tools or implements, moreover they may be used when machining work pieces by means of spark erosion (or eroding sparks).

It is an object of the invention to provide a device of the general character described which ensures that the slide or ram can be rapidly displaced vertically so as to always be maintained exactly parallel to itself.

Another object of the invention is to provide a device of the general character described with which an exact translatory movement of the slide or ram is obtained without it being necessary to use a complicated heavy construction as with the usual arrangements.

Yet another object of the invention is to provide a device of the above-mentioned type with which only little frictional resistance has to be taken into consideration.

A still another object of the invention is to provide a device of the abovesaid kind which has great stability and can be used in connection with great and heavy work pieces.

Figure 1:
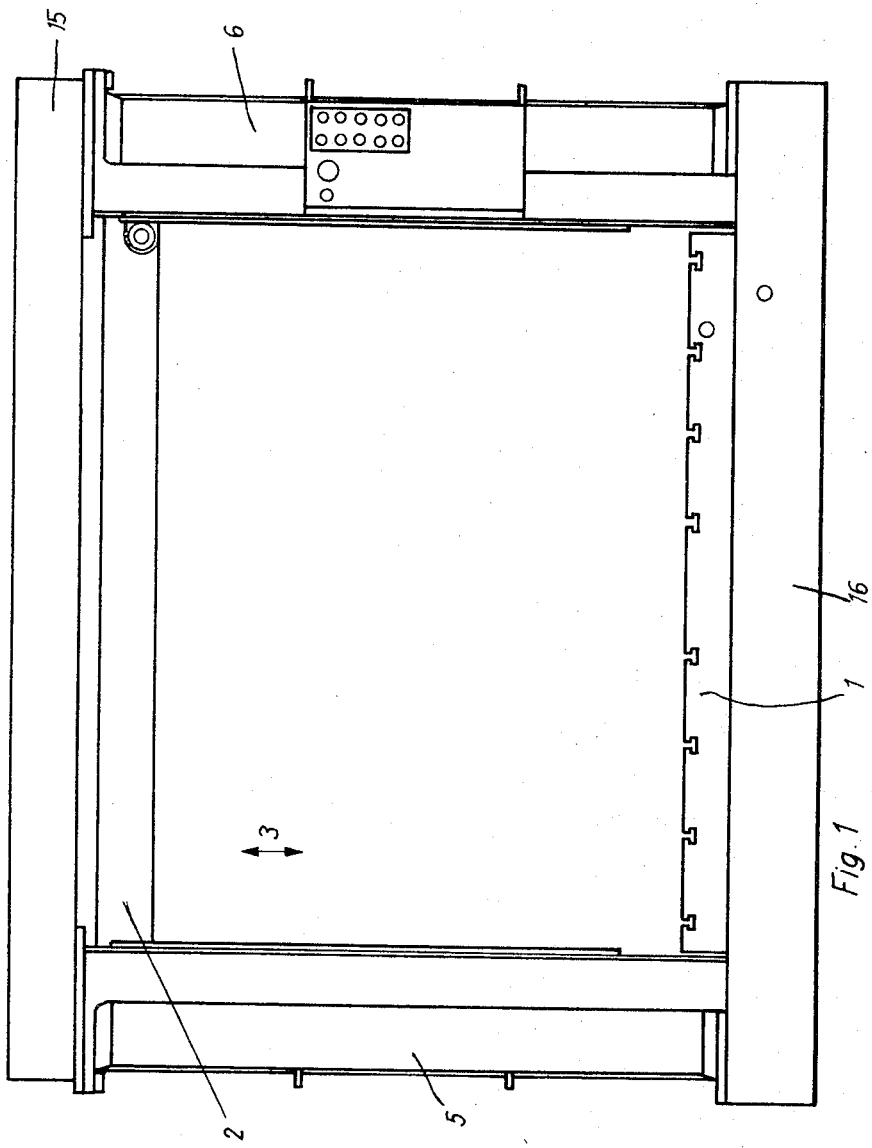
Figure 2:
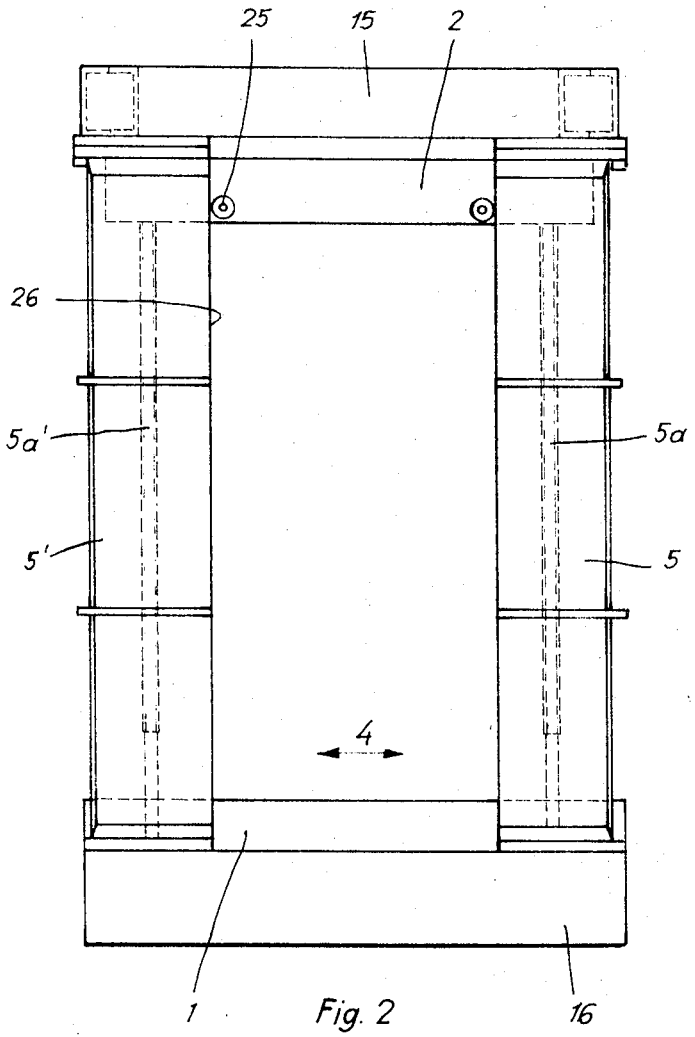
Figure 3:
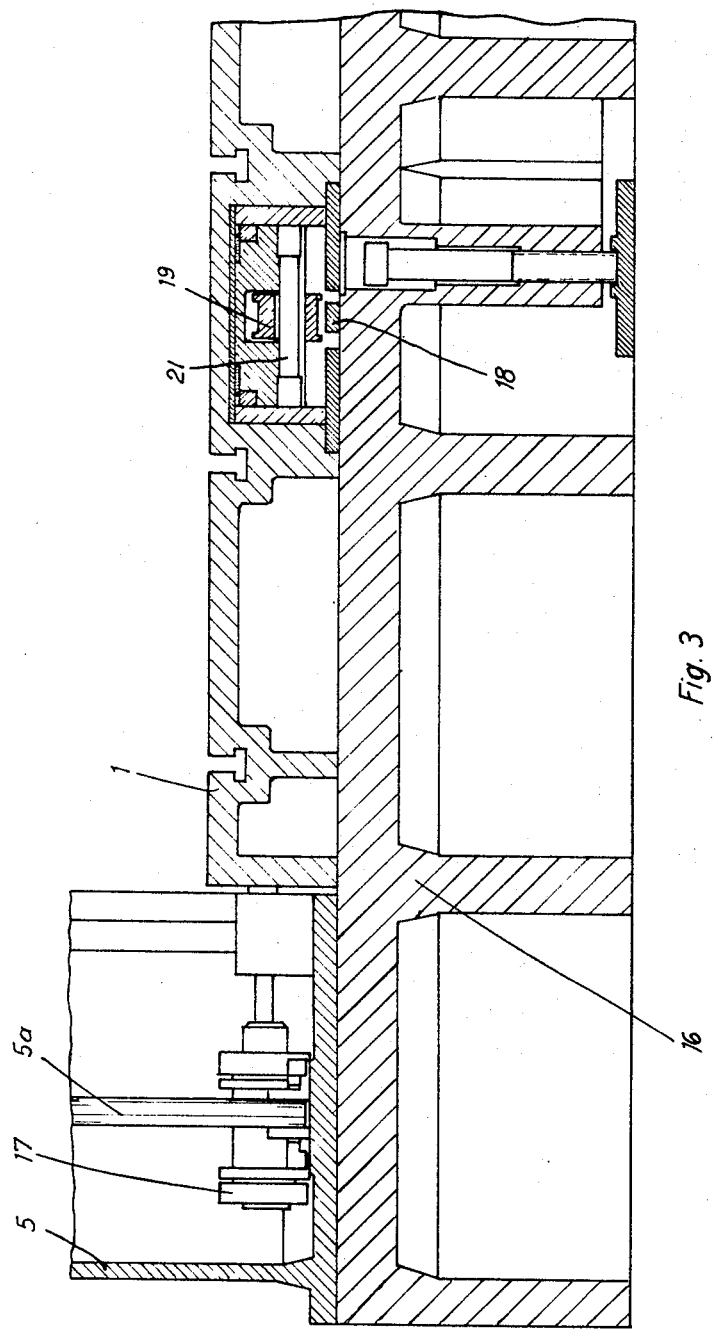
Figure 4:
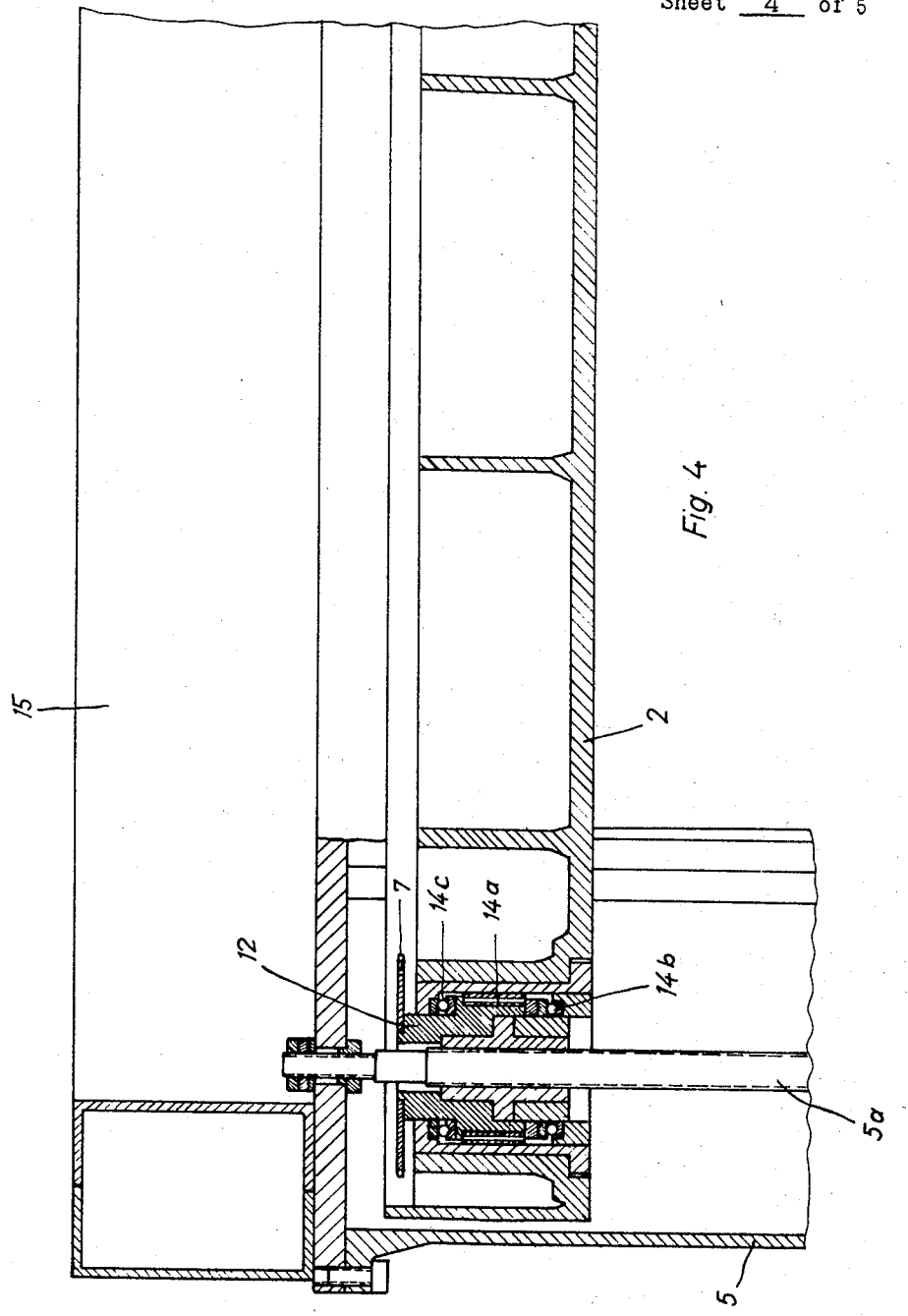
Figure 5:
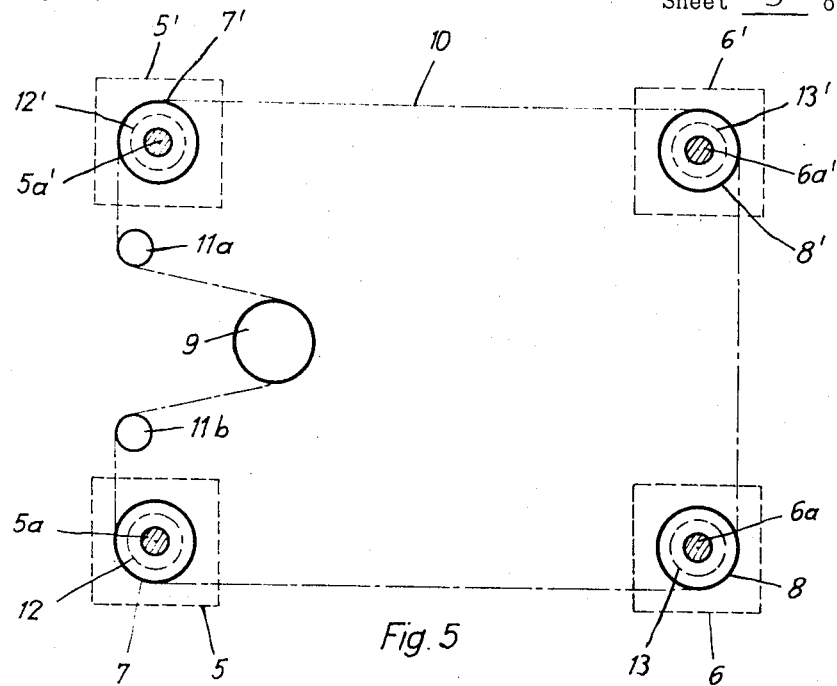
Figure 6:
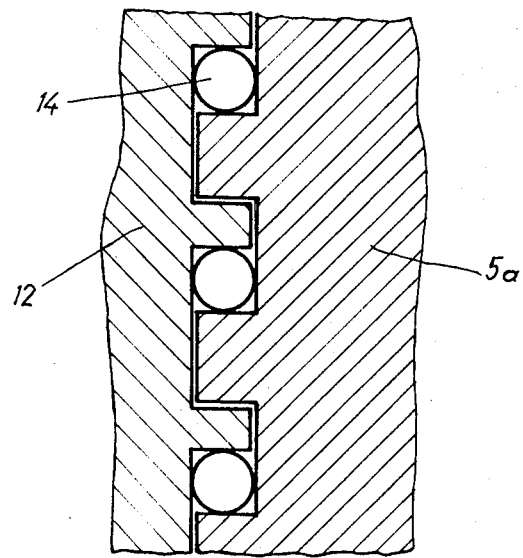

These and other objects, features and advantages of the present invention will become further apparent from the following detailed description thereof, particularly when the same is read with reference to the accompanying drawings, in which:

FIG. 1 is a total diagrammatic front view of the apparatus according to the invention, FIG. 2 is a side-view of the arrangement according to FIG. 1, FIG. 3 is a partial sectional front-view of a detail of the arrangement according to FIG. 1, namely the guide for the table, FIG. 4 is again a partial sectional front-view of another detail of the arrangement as shown in FIG. 1, namely the upper part of the device, FIG. 5 is a schematic plan view of an embodiment of a driving arrangement for the vertical up and down motion of the slide or ram, and FIG. 6 is a partial sectional side-view of a further detail of the invention, namely the mounting of the threaded spindles.

The device in accordance with the invention has a work table 1 and a press slide 2 which is—as indicated by the arrows 3—displaceable up and down in vertical direction towards the table and away from it, whereas the table in its turn can be displaced in and out horizontally as indicated by the arrows 4 (FIG. 2). As for the work pieces to be fitted into or upon each other, the one is attached to the table, whereas the other is attached to the press slide. Arrangements or devices of that kind working like presses can be used, e.g., for fitting models or patterns upon or into work pieces which must be finished and re-examined or checked with regard to the accuracy of their dimensions, for measuring and controlling control gauges, especially gauges that are used for the construction of voluminous tools or implements, for machining work pieces by means of spark erosion, etc.

The press slide 2 is—in accordance with the invention—conveniently constructed as a rectangular table and guided on four columns 5, 5', 6, 6' vertically erected on places corresponding to the corners of a rectangle. Within there are accommodate threaded spindles 5a, 5a', 6a, 6a', respectively. The vertically arranged threaded spindles situated likewise on places corresponding to the corners of a rectangle participate in producing the vertical up and down motion of the press and this motion is thereby produced by a sole common driving motor 9. The upper and lower ends of the said vertical spindles are attached to their respective columns as demonstrated in FIGS. 3 and 4. With the embodiment shown in the drawings, to the threaded spindles there are allotted in the upper zone of the spindles four chain-wheels 7, 8, 7', 8', respectively arranged in the area of the upper end of the threaded spindles. To the chain wheels there is allotted a common driving motor 9 connected with them via the drive chain 10 which, for example, is additionally laid round the tension rollers 11a, 11b. These chain wheels 7, 7', 8, 8' are—as can be taken from FIG. 4 chiefly—arranged on the rotating nuts 12, 12', 13, 13' which are mounted on the press slide 2 of the device by means of the bearings 14a, 14b, 14c so as to be rotatable and secured against axial thrusts and which enclose or surround the respective spindles. With respect to the press slide the rotating nuts are axially fixed, but rotatable. The rotating nuts known per se have an inner thread corresponding to the outer thread of the vertical spindles. The cooperation known per se between the outer thread of the vertical spindles and the inner thread of their rotating nuts is shown in FIG. 6 by means of an embodiment. The threaded spindles are constructed as hardened and wear-resisting spindles and as so called ball rolling spindles known per se which have an equal lead. Thereby, according to FIG. 6, balls 14 are inserted between the outer thread of the spindle 5a and the inner thread of the rotating nut 12 that is coordinated to it, whereby the friction is reduced as much as possible. Similar anti-friction bearing bodies or threaded spindles and nuts of usual construction may be employed eventually. The arrangement is such that upon starting the motor the nuts are rotated by means of the chain-wheels whereby said nuts rotate on their spindles and move up and down together with the press slide or ram in the axial direction of the spindles since the spindles are fixedly arranged. Thereby a displacement motion of the press slide or ram results which is extremely smooth though rapid and almost free from friction and during which the slide or ram is maintained exactly parallel to itself. It is of course possible to choose instead of the arrangement described above another driving aggregate for producing the up and down movement of the press slide or ram. It is, for instance, possible that the threaded spindles rotate, whereas the nuts are arranged on the slide or press so as not to be rotatable. It is also possible to use driving aggregates which work hydraulically or pneumatically, etc. Further, as drive for spindles there may be also used bevel gears arranged so as to be free from play.

The upper ends of the columns are connected with each other by a top frame 15 having the form of a shape or plate and serving at the same time as a stiffening element for the whole body of the device. This top part is parallel to the base plate 16 on which the lower ends of the columns are arranged which base plate is preferably plate-like shaped and on which the table 1 is mounted so as to be movable in and out horizontally.

Against lateral thrust the slide or ram 2 is supported by the rollers 25 (FIG. 2) which can be displaced eccentrically and which roll along the hardened vertical tracks 26 of the vertical columns. Conveniently, there are provided all in all eight rollers 25 between the columns, respectively.

A driving motor 17 operated, for example, electrically or hydraulically which is drivingly connected with the table by means of a suitable gearing has to produce the in- and outward motion of the table. The said gearing may, for instance, contain a rack and a pinion co-operating therewith, it can also consist of an endless chain or of a spindle with a suitable corresponding nut etc., whereby the pinion, the chain-wheels, the threaded spindle etc. can be moved by the motor directly or via appropriate driving elements or members inserted therebetween. The table is supported on rails 18 so as to be displaceable thereon by means of the rollers 19. The rails are provided on the base plate 16, whereas the rollers are mounted on the table 1 so as to be rotatable. To lock or fix the table in any respective position desired, an eccentric device 21 may be provided for lifting the rollers and removing them thereby from their rails, whereby in this case the table will sit down flatly on the base plate and lay there unremovably because of its enormous weight. To displace the table again, first the rollers must be rebrought by means of the eccentric device into their efficient or operative position in which they are supported on their rails whereupon the driving motor 17 can move the table to and fro. Moreover, there is a possibility to change the position of the table or to lock it in position also hydraulically by installing suitable support pieces that can be heaved up or let down. Advantageously, the exact position of the table can be determined by means of an indexing arrangement known per se.

Although my invention has been illustrated and described with reference to the preferred embodiments thereof, I wish to have it understood that it is in no way limited to the details of such embodiments, but is capable of numerous modifications.

Having thus fully described my invention, what I claim is:

1. Device constructed in the manner of a press for fitting gauging model or pattern elements upon or into work piece elements to determine whether they are true to size, comprising in combination: a frame comprising four vertically upstanding columns arranged at places corresponding to the corners of a rectangle; a work table connected to said frame and serving to support one of said elements; a slide serving to support the other of said elements, said slide being guided along said vertically extending columns so as to be vertically movable therealong in upward or downward direction; a driving means on said frame for driving said slide so as to move in upward or downward direction; a power transmitting means for transmitting the drive force from said driving means to said slide, said power transmitting means containing four vertically extending upstanding threaded spindles, one mounted in each of said columns and supported therein at its upper end and lower end, nuts rotatably mounted in said slide threadably engaged on said spindles, and means connecting all of said nuts to said driving means to be rotated thereby, wherein the said table is supported by means of rollers on rails on the base plate so as to be movable to and fro and in and out, and wherein the said table is fixable by lifting and removing the rollers from the rails, and wherein for lifting said gears and removing them from the rails an eccentric device is provided.

2. The device set forth in claim 1, wherein the upper ends of the said columns are interconnected by means of a top frame which is parallel to the base plate and serves to stiffen the whole body of the device.

3. The device set forth in claim 1, wherein said rotating nuts carry each a sprocket, and said connecting means comprises a chain connecting said sprockets.

4. The device set forth in claim 1, wherein to produce the in- and outward motion of the table a driving motor is provided which is operatively and drivingly connected with the table by means of a suitable gearing.

References Cited

UNITED STATES PATENTS

| | | | |
|---|---|---|---|
| 1,512,279 | 10/1924 | Diehl | 100—290 X |
| 2,773,436 | 12/1956 | Lange | 100—290 X |
| 2,811,781 | 11/1957 | Johnson et al. | 33—174 |
| 2,896,529 | 7/1959 | Shiokawa | 100—290 |
| 3,046,667 | 7/1962 | Martineau | 33—174 |
| 3,046,669 | 7/1962 | Lasko | 33—174 |
| 3,172,209 | 3/1965 | Reichart | 33—174 |

SAMUEL S. MATTHEWS, *Primary Examiner.*

U.S. Cl. X.R.

100—290

UNITED STATES PATENT OFFICE

CERTIFICATE OF CORRECTION

Patent No. 3,429,048                      February 25, 1969

Eberhard Haas

It is certified that error appears in the above identified patent and that said Letters Patent are hereby corrected as shown below:

In the heading to the drawings, Sheets 1 to 5, line 1 thereo: "H. EBERHARD", each occurrence, should read -- E. HAAS --. In th( heading to the printed specification, line 3, "Haas Eberhard" should read -- Eberhard Haas --.

Signed and sealed this 24th day of March 1970.

(SEAL)
Attest:

Edward M. Fletcher, Jr.                    WILLIAM E. SCHUYLER, JR.

Attesting Officer                            Commissioner of Patents